US012655245B2

(12) United States Patent
Hoshino et al.

(10) Patent No.: US 12,655,245 B2
(45) Date of Patent: Jun. 16, 2026

(54) POLYCARBONATE DIOL COMPOSITION

(71) Applicant: ASAHI KASEI KABUSHIKI KAISHA, Tokyo (JP)

(72) Inventors: Eriko Hoshino, Tokyo (JP); Yasufumi Kawai, Tokyo (JP); Tetsuo Masubuchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 879 days.

(21) Appl. No.: 17/765,277

(22) PCT Filed: Oct. 15, 2020

(86) PCT No.: PCT/JP2020/038939
§ 371 (c)(1),
(2) Date: Mar. 30, 2022

(87) PCT Pub. No.: WO2021/075503
PCT Pub. Date: Apr. 22, 2021

(65) Prior Publication Data
US 2022/0411565 A1     Dec. 29, 2022

(30) Foreign Application Priority Data

Oct. 15, 2019    (JP) ................................. 2019-188929

(51) Int. Cl.
| | |
|---|---|
| *C08G 18/44* | (2006.01) |
| *B32B 5/02* | (2006.01) |
| *B32B 7/12* | (2006.01) |
| *B32B 27/12* | (2006.01) |
| *B32B 27/40* | (2006.01) |

(52) U.S. Cl.
CPC ............... *C08G 18/44* (2013.01); *B32B 5/02* (2013.01); *B32B 7/12* (2013.01); *B32B 27/12* (2013.01); *B32B 27/40* (2013.01)

(58) Field of Classification Search
None
See application file for complete search history.

(56) References Cited

U.S. PATENT DOCUMENTS

| | | | |
|---|---|---|---|
| 4,808,691 A | 2/1989 | Konig et al. | |
| 5,137,935 A | 8/1992 | Bott et al. | |
| 2006/0223973 A1 | 10/2006 | Hinz et al. | |
| 2009/0143555 A1 | 6/2009 | Dicosimo et al. | |
| 2011/0020590 A1* | 1/2011 | Yoneda ................... | B32B 5/022 156/308.2 |
| 2022/0411565 A1 | 12/2022 | Hoshino et al. | |

FOREIGN PATENT DOCUMENTS

| | | | |
|---|---|---|---|
| EP | 0216106 A2 | | 4/1987 |
| EP | 2736974 A2 | | 6/2014 |
| EP | 3141574 A1 | | 3/2017 |
| EP | 3733799 A1 | | 11/2020 |
| EP | 4026863 A1 | | 7/2022 |
| JP | S62-045624 A | | 2/1987 |
| JP | S63-305127 A | | 12/1988 |
| JP | H3-252420 A | | 11/1991 |
| JP | H4-214720 A | | 8/1992 |
| JP | 2002179759 | * | 6/2002 |
| JP | 2006-124485 A | | 5/2006 |
| JP | 2006-124486 A | | 5/2006 |
| JP | 2011-505466 A | | 2/2011 |
| JP | 2011190392 | * | 9/2011 |
| JP | 2014-080530 A | | 5/2014 |
| JP | 2016-027119 A | | 2/2016 |
| WO | WO 2015/170374 A1 | | 11/2015 |
| WO | WO 2019/131617 A1 | | 7/2019 |
| WO | WO 2021/075503 A1 | | 4/2021 |

OTHER PUBLICATIONS

Machine Translation of JP2014080530 (Year: 2014).*
Machine Translation of JP2002179759 (Year: 2002).*
Machine Translation of JP2011190392 (Year: 2011).*
International Preliminary Report on Patentability issued to International App No. PCT/JP2020/038939 dated Apr. 19, 2022, along with English translation thereof.
ESR for EP App. No. 20876165.0, dated Nov. 17, 2022.
ISR for PCT/JP2020/038939, dated Jan. 12, 2021.
Written Opinion for PCT/JP2020/038939, dated Jan. 12, 2021 (w/ translation).

* cited by examiner

*Primary Examiner* — Shawn Mckinnon
(74) *Attorney, Agent, or Firm* — Greenblum & Bernstein, P.L.C.

(57)                ABSTRACT

A polycarbonate diol composition comprising polycarbonate diol having a structure represented by the following general formula (I) and a polycarbonate structure represented by the following general formula (II), wherein melt viscosity at 50° C. is 1000 to 10000 mPa·s, and an average value of the number of repeats represented by $n_{11}$ in the following general formula (I) is 12 or larger:

$$-\!\!\left(\!R^{11}\!-\!O\right)_{\!n_{11}}\!\!- \tag{I}$$

$$-\!\!\left(\!R^{21}\!-\!O\!-\!CO\!-\!O\right)_{\!n_{21}}\!\!-, \tag{II}$$

13 Claims, No Drawings

POLYCARBONATE DIOL COMPOSITION

TECHNICAL FIELD

The present invention relates to a polycarbonate diol composition.

BACKGROUND ART

Polyurethane resins have heretofore been used in a wide range of fields such as synthetic leather, artificial leather, adhesives, coating materials for furniture, and coating materials for automobiles. Of raw materials of the polyurethane resins, polyether, polyester, and polycarbonate are used as polyol components to be reacted with isocyanate. However, in recent years, there has been a growing demand for the resistance, such as heat resistance, weather resistance, hydrolysis resistance, solvent resistance, sunscreen resistance, or scratch resistance, of polyurethane resins.

According to Non Patent Document 1, in general, polyether polyol as a polyol component has low viscosity. Hence, polyurethane obtained using polyether polyol is reportedly excellent in flexibility and hydrolysis resistance but inferior in heat resistance or weather resistance. Polyurethane obtained using polyester polyol is inferior in hydrolysis resistance, though heat resistance and weather resistance are improved. By contrast, polyurethane obtained using polycarbonate polyol has the best tough grade in terms of durability such as heat resistance, chemical resistance, and hydrolysis resistance.

For example, Patent Document 1 discloses a method for producing copolymerized polycarbonate diol economically and conveniently. For example, Patent Document 2 discloses a polycarbonate diol/polyether block copolymer.

LIST OF PRIOR ART DOCUMENTS

Patent Document

Patent Document 1: Japanese Patent Laid-Open No. 3-252420
Patent Document 2: Japanese Patent Laid-Open No. 2006-124486

Non Patent Document

Non Patent Document 1: "Case Studies of Polyurethane Material Selection, Structure Control and Modification" published by Technical Information Institute Co., Ltd., 1st edition issued in December 2014, pp. 51-62

SUMMARY OF INVENTION

Problems to be Solved by Invention

However, polycarbonate polyol has high viscosity and requires a large amount of a solvent for the production of coating materials or polyurethane. A polyurethane resin obtained using polycarbonate diol described in Patent Document 1 or 2 is susceptible to improvement for purposes that require strict physical properties of low-temperature flexibility and durability.

Accordingly, the present invention has been made in light of the situation described above, and an object of the present invention is to provide a polycarbonate diol composition that is capable of reducing the amount of a solvent used at the time of coating material or polyurethane production, can produce polyurethane excellent in low-temperature flexibility and also excellent in oleic acid resistance and moist heat resistance, and can produce a coating material composition excellent in film formability even if a solid content concentration is high.

Means for Solving Problems

The present inventor has conducted diligent studies and consequently completed the present invention by finding that a polycarbonate diol composition that contains a polycarbonate diol having a specific structure and has a melt viscosity in a specific range at 50° C. is capable of reducing the amount of a solvent used at the time of coating material or polyurethane production, can produce polyurethane excellent in low-temperature flexibility and also excellent in oleic acid resistance and moist heat resistance, and can produce a coating material composition excellent in film formability even if a solid content concentration is high.

Specifically, the present invention includes the following aspects.

[1]

A polycarbonate diol composition comprising a polycarbonate diol having a structure represented by the following general formula (I) and a polycarbonate structure represented by the following general formula (II), wherein a melt viscosity at 50° C. is 1000 to 10000 mPa·s, and an average value of the number of repeats represented by n11 in the following general formula (I) is 12 or larger:

$$-(R^{11}-O)_{\overline{n11}} \tag{I}$$

wherein $R^{11}$ is a divalent linear, branched or cyclic aliphatic, or aromatic hydrocarbon group having 2 or more and 20 or less carbon atoms, and a plurality of $R^{11}$ moieties are the same as or different from each other; and n11 is an arbitrary integer, $$-(R^{21}-O-CO-O)_{\overline{n21}} \tag{II}$$

wherein $R^{21}$ is a divalent linear, branched or cyclic aliphatic, or aromatic hydrocarbon group having 2 or more and 15 or less carbon atoms, and a plurality of $R^{21}$ moieties are the same as or different from each other; and n21 is an arbitrary integer.

[2]

The polycarbonate diol composition according to [1], wherein the average value of the number of repeats represented by n11 in the general formula (I) is 15 or larger.

[3]

The polycarbonate diol composition according to [1] or [2], wherein at least a portion of the polycarbonate diol has a structure of the general formula (II) wherein $R^{21}$ is at least two or more selected from the group consisting of divalent linear and branched aliphatic hydrocarbon groups having 2 or more and 15 or less carbon atoms.

[4]

The polycarbonate diol composition according to any of [1] to [3], wherein a structure of the general formula (I) wherein $R^{11}$ is a divalent linear and/or branched aliphatic hydrocarbon group having 3 carbon atoms constitutes 60% by mass or more and 95% by mass or less of the structure represented by the general formula (I).

[5]

The polycarbonate diol composition according to any of [1] to [4], wherein based on the total mass of the structure represented by the general formula (I) and the polycarbonate structure represented by the general formula (II), a content of the structure represented by the general formula (I) is 5% by mass or more and 40% by mass or less, and a content of the polycarbonate structure represented by the general formula (II) is 60% by mass or more and 95% by mass or less.

[6]

The polycarbonate diol composition according to any of [1] to [5], wherein a glass transition temperature measured with a differential scanning calorimeter is −50° C. or lower.

[7]

The polycarbonate diol composition according to any of [1] to [6], wherein state at 23° C. is liquid and transparent.

[8]

The polycarbonate diol composition according to any of [1] to [7], wherein an area ratio (%) of a number-average molecular weight (Mn) of 1000 or lower in molecular weight calculation results of the polycarbonate diol composition obtained by calculation by gel permeation chromatography is 7% or less.

[9]

A polyurethane prepared using the polycarbonate diol composition according to any of [1] to [8].

[10]

A synthetic leather comprising a base fabric, an adhesive layer, an intermediate layer and a surface skin layer laminated in order, the synthetic leather comprising the polyurethane according to [9].

Advantages of Invention

The polycarbonate diol composition of the present invention is capable of reducing the amount of a solvent used at the time of coating material or polyurethane production, can produce polyurethane excellent in low-temperature flexibility and also excellent in oleic acid resistance and moist heat resistance, and can produce a coating material composition excellent in film formability even if a solid content concentration is high.

MODE FOR CARRYING OUT INVENTION

Hereinafter, the mode for carrying out the present invention (hereinafter, referred to as the "present embodiment") will be described in detail. The present invention is not limited by the description below and can be carried out with various modification or changes made therein without departing from the spirit of the present invention.

[Polycarbonate Diol Composition]

The polycarbonate diol composition of the present embodiment contains a polycarbonate diol having a structure represented by the following general formula (I) (hereinafter, also referred to as a "structure (I)") and a polycarbonate structure represented by the following general formula (II) (hereinafter, also referred to as a "polycarbonate structure (II)") in the molecular chain, and the average value of the number of repeats represented by n11 in the following general formula (I) is 12 or more.

$$-\!\!\left(\!R^{11}\!-\!O\!\right)_{\!n11}\!\!-$$

(I)

wherein $R^{11}$ is a divalent linear, branched or cyclic aliphatic, or aromatic hydrocarbon group having 2 or more and 20 or less carbon atoms, and a plurality of $R^{11}$ moieties are the same as or different from each other; and n11 is an arbitrary integer.

$$-\!\!\left(\!R^{21}\!-\!O\!-\!CO\!-\!O\!\right)_{\!n21}\!\!-$$

(II)

wherein $R^{21}$ is a divalent linear, branched or cyclic aliphatic, or aromatic hydrocarbon group having 2 or more and 15 or less carbon atoms, and a plurality of $R^{21}$ moieties are the same as or different from each other; and n21 is an arbitrary integer.

[Structure (I)]

In the polycarbonate diol composition of the present embodiment, the content of the structure (I) is preferably 5% by mass or more and 40% by mass or less, more preferably 10% by mass or more and 35% by mass or less, based on the total mass of the structure (I) and the polycarbonate structure (II).

When the content of the structure (I) is equal to or more than the lower limit value described above, the viscosity of the polycarbonate diol composition tends to be reduced. When the content of the structure (I) is equal to or less than the upper limit value described above, polyurethane much superior in durability such as chemical resistance and moist heat resistance is obtained, which is preferred.

In the polycarbonate diol used in the present embodiment, the terminal structure of the structure (I) is a terminal structure where one of the ends is bonded to a carbonate group, and the other end is bonded to a hydroxy group, a terminal structure where both ends are bonded to carbonate groups, or a terminal structure where both ends are bonded to hydroxy groups.

In the polycarbonate diol used in the present embodiment, the terminal structure of the structure (I) may be a mixture of a terminal structure where one of the ends is bonded to a carbonate group, and the other end is bonded to a hydroxy group, and a terminal structure where both ends are bonded to carbonate groups.

Hereinafter, the structure (I) will be described in detail.

($R^{11}$)

In the general formula (I), $R^{11}$ is a divalent linear, branched or cyclic aliphatic, or aromatic hydrocarbon group having 2 or more and 20 or less carbon atoms, and a plurality of $R^{11}$ moieties are the same as or different from each other.

The divalent linear aliphatic hydrocarbon group represented by $R^{11}$ has 2 or more and 20 or less, preferably 2 or more and 12 or less, more preferably 2 or more and 6 or less carbon atoms.

Specific examples of the divalent linear aliphatic hydrocarbon group represented by $R^{11}$ include, but are not particularly limited to, an ethylene group, a trimethylene group, a tetramethylene group, a pentamethylene group, a hexamethylene group, a heptylene group, and an octylene group.

The divalent branched aliphatic hydrocarbon group represented by $R^{11}$ has 3 or more and 20 or less, preferably 3 or more and 12 or less, more preferably 3 or more and 6 or less carbon atoms.

Specific examples of the divalent branched aliphatic hydrocarbon group represented by $R^{11}$ include, but are not particularly limited to, an isopropylene group, an isobutylene group, a tert-butylene group, an isopentylene group, a 2,2-dimethyltrimethylene group, an isohexylene group, an isoheptylene group, and an isooctylene group.

The divalent cyclic aliphatic hydrocarbon group represented by $R^{11}$ has 6 or more and 20 or less, preferably 6 or more and 15 or less, more preferably 6 or more and 8 or less carbon atoms.

Specific examples of the divalent cyclic aliphatic hydrocarbon group represented by $R^{11}$ include, but are not particularly limited to, a cyclobutylene group, a cyclopentylene group, a cyclohexylene group, and a cycloheptylene group.

The divalent aromatic hydrocarbon group represented by $R^{11}$ has 6 or more and 15 or less, preferably 6 or more and 12 or less, more preferably 6 or more and 10 or less carbon atoms.

Specific examples of the divalent aromatic hydrocarbon group represented by $R^{11}$ include, but are not particularly limited to, a phenylene group and a naphthylene group.

Among others, $R^{11}$ is preferably a divalent linear, branched or cyclic aliphatic hydrocarbon group having 2 or more and 20 or less carbon atoms (i.e., an alkylene group), more preferably a divalent linear aliphatic hydrocarbon group having 2 or more and 6 or less carbon atoms, and/or a divalent branched aliphatic hydrocarbon group having 3 or more and 6 or less carbon atoms. Particularly, when $R^{11}$ contains a divalent branched aliphatic hydrocarbon group, polyurethane much superior in low-temperature characteristics and durability such as chemical resistance and moist heat resistance tends to be obtained.

The structure of the general formula (I) wherein $R^{11}$ is a divalent linear and/or branched aliphatic hydrocarbon group having 3 carbon atoms preferably constitutes 60% by mass or more and 95% by mass or less, more preferably 70 to 95% by mass, of the structure represented by the general formula (I). When the content ratio of the structure of the general formula (I) wherein $R^{11}$ is a divalent linear and/or branched aliphatic hydrocarbon group having 3 carbon atoms falls within the range described above, polyurethane excellent in transparency and much superior in low-temperature characteristics tends to be obtained.

In the present embodiment, the ratio of the structure of the general formula (I) wherein $R^{11}$ is a divalent linear and/or branched aliphatic hydrocarbon group having 3 carbon atoms to the polycarbonate diol can be determined by the following method.

A sample is dissolved in deuterochloroform (manufactured by Sigma-Aldrich Co. LLC) to obtain a 3 w/v % solution. Tetramethylsilane (TMS) is added as a chemical shift reference to the solution, and $^1$H-NMR of the obtained solution is measured using JNM-ECA500 manufactured by JEOL Ltd. In the measurement, $^1$H-NMR spectra are obtained with 0 ppm of TMS signals at a resonant frequency of 500 MHz and a cumulated number of 128 times. The ratio of the structure having a divalent linear and/or branched aliphatic hydrocarbon group having 3 carbon atoms can be determined from the spectra.

(n11)

In the general formula (I), n11 represents the number of repeats of the structure (—$R^{11}$—O—). In the general formula (I), n11 is an arbitrary integer, and the average value of n11 in the whole polycarbonate diol composition of the present embodiment is 12 or larger, preferably in the range of 12 or larger and 70 or smaller, more preferably in the range of 12 or larger and 60 or smaller, particularly preferably in the range of 15 or larger and 50 or smaller.

When the average value of n11 in the whole polycarbonate diol composition of the present embodiment is equal to or larger than the lower limit value described above, polyurethane much superior in flexibility and low-temperature flexibility tends to be obtained. When the average value of n11 in the whole polycarbonate diol composition of the present embodiment is equal to or smaller than the upper limit value described above, the polycarbonate diol composition tends to have lower viscosity.

n11 described above can be determined by isolating the raw material diol component through the alkali decomposition of the polycarbonate diol composition, and subjecting the component to GC-MS measurement, LC-MS measurement and gel permeation chromatography (GPC) measurement. Specifically, n11 can be determined by a method described in Examples mentioned later.

Among others, the structure (I) is preferably a polyoxyalkylene structure.

Specific examples of the preferred oxyalkylene group contained in the structure (I) include, but are not particularly limited to, an oxyethylene group, an oxy-1-methylethylene group, an oxytetramethylene group, and an oxy-2,2-dimethyltrimethylene group. Among others, a structure containing an oxy-1-methylethylene group is preferred, and an oxy-1-methylethylene group and an oxyethylene group are particularly preferred. When the preferred oxyalkylene group contained in the structure (I) is the structure described above, the polycarbonate diol composition becomes liquid at ordinary temperature by the introduction of a side chain methyl group and is thus excellent in workability. Furthermore, the resulting polyurethane tends to be rich in flexibility and low-temperature characteristics.

When the structure (I) comprises an oxy-1-methylethylene group and an oxyethylene group, the structure (I) preferably contains 60% by mass or more and 95% by mass or less of the oxy-1-methylethylene group and 5% by mass or more and 40% by mass or less of the oxyethylene group based on the total mass of the structure (I). When the ratio of the oxy-1-methylethylene group based on the total mass of the structure (I) is equal to or more than the lower limit value described above, polyurethane is excellent in low-temperature characteristics. When the ratio is equal to or less than the upper limit value described above, polyurethane in the form of a film tends to be excellent in breaking strength.

[Polycarbonate Structure (II)]

In the polycarbonate diol composition of the present embodiment, the content of the polycarbonate structure (II) is preferably 60% by mass or more and 95% by mass or less, more preferably 65% by mass or more and 90% by mass or less, based on the total mass of the structure (I) and the polycarbonate structure (II).

When the content of the polycarbonate structure (II) is equal to or more than the lower limit value described above, polyurethane much superior in moist heat resistance, chemical resistance, etc. is obtained. When the content of the polycarbonate structure (II) is equal to or less than the upper limit value described above, the polycarbonate diol composition tends to have lower viscosity.

Hereinafter, the polycarbonate structure (II) will be described in detail.

($R^{21}$)

In the general formula (II), $R^{21}$ is a divalent linear, branched or cyclic aliphatic, or aromatic hydrocarbon group having 2 or more and 15 or less carbon atoms, and a plurality of $R^{21}$ moieties are the same as or different from each other.

The divalent linear aliphatic hydrocarbon group represented by $R^{21}$ has 2 or more and 15 or less, preferably 3 or more and 12 or less, more preferably 3 or more and 10 or less carbon atoms.

Specific examples of the divalent linear aliphatic hydrocarbon group having 2 or more 15 or less carbon atoms represented by $R^{21}$ include the same as those listed as examples for $R^{11}$ described above. Among others, a butylene group, a pentylene group or a hexylene group is preferred from the viewpoint of versatility.

The divalent branched aliphatic hydrocarbon group represented by $R^{21}$ has 3 or more and 15 or less, preferably 3 or more and 12 or less, more preferably 3 or more and 10 or less carbon atoms.

Specific examples of the divalent branched aliphatic hydrocarbon group having 2 or more and 15 or less carbon atoms represented by $R^{21}$ include the same as those listed as examples for $R^{11}$ described above. Among others, an isopentylene group or an isohexylene group is preferred from the viewpoint of versatility.

The divalent cyclic aliphatic hydrocarbon group represented by $R^{21}$ has 3 or more and 15 or less, preferably 6 or more and 15 or less, more preferably 6 or more and 10 or less carbon atoms.

Specific examples of the divalent cyclic aliphatic hydrocarbon group represented by $R^{21}$ include the same as those listed as examples for $R^{11}$ described above. Among others, a cyclohexylene group is preferred from the viewpoint of versatility.

The divalent aromatic hydrocarbon group represented by $R^{21}$ has 6 or more and 15 or less, preferably 6 or more and 12 or less, more preferably 6 or more and 10 or less carbon atoms.

Specific examples of the divalent aromatic hydrocarbon group represented by $R^{21}$ include the same as those listed as examples for $R^{11}$ described above.

Among others, $R^{21}$ is preferably a divalent linear aliphatic hydrocarbon group having 3 or more and 10 or less carbon atoms or a divalent branched aliphatic hydrocarbon group having 3 or more and 10 or less carbon atoms, more preferably a divalent linear aliphatic hydrocarbon group having 4 or more and 6 or less carbon atoms, still more preferably a butylene group and a hexylene group as a divalent linear aliphatic hydrocarbon group.

In the polycarbonate diol composition of the present embodiment, at least a portion of the polycarbonate diol preferably has a structure of the general formula (II) wherein $R^{21}$ is at least two or more selected from the group consisting of divalent linear and branched aliphatic hydrocarbon groups having 2 or more and 15 or less carbon atoms. In this case, a polycarbonate diol composition that is liquid at ordinary temperature tends to be obtained.

In the present embodiment, the composition of $R^{21}$ in the general formula (II) in the polycarbonate diol can be determined by the following method.

First, 1 g of a sample is weighed into a 100 ml eggplant-shaped flask, in which 30 g of ethanol and 4 g of potassium hydroxide are then placed to obtain a mixture. The obtained mixture is heated for 1 hour in an oil bath of 100° C. The mixture is cooled to room temperature. Then, one to two drops of phenolphthalein are added as an indicator to the mixture, which is then neutralized with hydrochloric acid. Then, the mixture is cooled in a refrigerator for 3 hours, and a precipitated salt is filtered off, followed by the analysis of the filtrate by gas chromatography (hereinafter, referred to as GC) under predetermined analysis conditions. The composition of $R^{21}$ in the general formula (II) in the polycarbonate diol can be determined on the basis of the area value of a diol compound obtained by the GC analysis.

(n21)

In the general formula (II), n21 represents the number of repeats of the carbonate structure ($-R^{21}-O-CO-O-$). n21 is an arbitrary integer, and the average value of n21 in the whole polycarbonate diol composition of the present embodiment is preferably in the range of 1 or larger and 50 or smaller, more preferably in the range of 2 or larger and 50 or smaller, further preferably in the range of 3 or larger and 30 or smaller, particularly preferably in the range of 4 or larger and 20 or smaller.

n21 can be determined by isolating the raw material diol component through the alkali decomposition of the polycarbonate diol composition, and subjecting the component to GC-MS measurement, LC-MS measurement and GPC measurement. Specifically, n21 can be determined by a method described in Examples mentioned later.

In the polycarbonate diol composition of the present embodiment, the content of the structure represented by the general formula (I) and the content of the polycarbonate structure (II) can be measured by, for example, the following procedures (1) to (4).

(1) The polycarbonate diol composition is alkali-hydrolyzed in an ethanolic potassium hydroxide solution to regenerate a diol component.

(2) Phenolphthalein is used as an indicator, and the mixture is neutralized by the addition of hydrochloric acid.

(3) A deposited salt is filtered off, and the filtrate is measured by gel permeation chromatography (hereinafter, also abbreviated to GPC).

(4) The concentration of a diol having hydroxy groups at both ends of the structure represented by the general formula (I) in the filtrate is determined from a separately prepared calibration curve. The mass of the diol having hydroxy groups at both ends of the structure represented by the general formula (I) is calculated from the concentration and divided by the mass of the polycarbonate diol composition used in the alkali hydrolysis. The obtained value is the content of the diol having hydroxy groups at both ends of the structure represented by the general formula (I).

The terminal structure of the structure represented by the general formula (I) in the polycarbonate diol composition is a terminal structure where one of the ends is bonded to a carbonate group ($-O-CO-O-$), and the other end is bonded to a hydroxy group ($-OH$), a terminal structure where both ends are bonded to carbonate groups ($-O-CO-O-$), or a terminal structure where both ends are bonded to hydroxy groups ($-OH$).

A molecule having the structure represented by the general formula (I) in the polycarbonate diol composition has hydroxy groups at both ends.

The molecule having the polycarbonate structure contained in the polycarbonate diol composition has hydroxy groups at both ends thereof. Specifically, the molecule having the polycarbonate structure contained in the polycarbonate diol composition is polycarbonate diol. A portion of the terminal hydroxy groups may be converted to an alkyl group, an aryl group or the like unreactive with an isocyanate group due to impurities in various raw materials for use in the production of the polycarbonate diol composition, a terminal structure that is secondarily produced during the production of the polycarbonate diol composition, etc., or in order to control a urethanization reaction rate or state for the purpose of using the polycarbonate diol composition. In the present embodiment, in consideration of such a case, the terminal groups of the polycarbonate diol also encompass the case where 100% by mol of groups at both ends is not strictly a hydroxy group. From such a viewpoint, the ratio of the hydroxy groups to the total molar quantity of terminal groups is preferably 90% by mol or more, more preferably 95% by mol or more.

The structures at both ends of the polycarbonate diol contained in the polycarbonate diol composition can be confirmed in accordance with, for example, a method for measuring a primary terminal OH ratio, described in Japanese Patent No. 3874664 (Reference 1). Ethanol as well as a solvent such as tetrahydrofuran, acetone, or methanol can be used as a solvent recovering fractions.

[Melt Viscosity at 50° C.]

The melt viscosity at 50° C. of the polycarbonate diol composition of the present embodiment measured in a type E viscometer (hereinafter, referred to as "melt viscosity at 50° C.") is 1000 to 10000 mPa·s, preferably 2000 to 9600 mPa·s, more preferably 2500 to 9600 mPa·s.

When the melt viscosity at 50° C. is equal to or more than the lower limit value, cissing or surface asperities tend to be suppressed and film formability is excellent in forming a coating film using a coating material or polyurethane obtained using the polycarbonate diol composition of the present embodiment. When the melt viscosity at 50° C. is equal to or less than the upper limit value, the amount of a solvent used in a coating material or polyurethane production can be reduced. In this context, the "cissing" refers to a phenomenon, such as water repelling, in which base material surface repels a coating material.

The method for controlling the melt viscosity at 50° C. within the range mentioned above is not particularly limited and can be achieved, for example, by adjusting the ratios of the structure represented by the general formula (I) and the polycarbonate structure (II), or the number-average molecular weight of the polycarbonate diol composition.

A larger ratio of the structure represented by the general formula (I) tends to lower the melt viscosity at 50° C., while a larger ratio of the polycarbonate structure (II) tends to elevate the melt viscosity at 50° C.

In the case of adjusting the viscosity of the polycarbonate diol composition by its number-average molecular weight, a smaller number-average molecular weight of the polycarbonate diol composition lowers the melt viscosity at 50° C., while a larger number-average molecular weight of the polycarbonate diol composition elevates the melt viscosity at 50° C.

The number-average molecular weight of the polycarbonate diol composition used in the present embodiment is preferably 300 or higher and 10000 or lower, more preferably 400 or higher and 10000 or lower, further preferably 850 or higher and 3000 or lower.

When the polycarbonate diol composition used in the present embodiment has a high number-average molecular weight, flexibility in the form of polyurethane tends to be favorable, though the melt viscosity at 50° C. is high. When the polycarbonate diol composition used in the present embodiment has a low number-average molecular weight, flexibility tends to be poor due to the increased amount of a urethane bond, though the melt viscosity at 50° C. is low.

In the present embodiment, the number-average molecular weight can be calculated from the hydroxy value of the polycarbonate diol composition by use of a method described in Examples mentioned later.

[Glass Transition Temperature (Tg)]

The glass transition temperature (Tg) of the polycarbonate diol composition of the present embodiment measured with a differential scanning calorimeter (hereinafter, also abbreviated to "DSC") is preferably −50° C. or lower, more preferably −55° C. or lower, further preferably −57° C. or lower. When the glass transition temperature (Tg) of the polycarbonate diol composition of the present embodiment is equal to or less than the upper limit value described above, flexibility in the form of polyurethane tends to be improved under low-temperature conditions. When the lower limit value of the glass transition temperature (Tg) of the polycarbonate diol composition of the present embodiment is not particularly limited and is, for example, −90° C.

Examples of the method for obtaining the polycarbonate diol composition having a glass transition temperature (Tg) within the range described above include, but are not particularly limited to, a method of adjusting Tg by comprehensively taking into consideration conditions such as the ratios and types of the structure represented by the general formula (I) and the polycarbonate structure (II), and the number-average molecular weight.

[State]

The state at 23° C. of the polycarbonate diol composition of the present embodiment is preferably liquid and transparent. For use as a constituent of a coating material, the polycarbonate diol composition of the present embodiment that is liquid and transparent at 23° C. which is ordinary temperature is less likely to be white turbid even if used in a transparent coating material, and is thus less likely to be limited by purposes.

Examples of the method for obtaining the polycarbonate diol composition whose state at 23° C. is liquid and transparent include, but are not particularly limited to, a method of appropriately selecting the types and amounts of the raw materials of the polycarbonate diol composition.

The evaluation of transparency is not particularly limited, and the transparency can be measured with, for example, a turbidimeter based on integrating sphere photoelectric photometry.

<Method for Producing Polycarbonate Diol Composition>

The polycarbonate diol composition of the present embodiment can be obtained through transesterification reaction using ether diol represented by the following general formula (I-1) (hereinafter, also referred to as "ether diol (I-1)") and polycarbonate diol represented by the following general formula (II-1) (hereinafter, also referred to as "polycarbonate diol (II-1)"):

$$HO \left( R^{111}\text{-}O \right)_{n111} OH \tag{I-1}$$

wherein $R^{111}$ is the same as $R^{11}$ described above; and n111 is the same as n11 described above, and $$HO \left( R^{211}\text{-}O\text{---}CO\text{---}O \right)_{n211} R^{212}\text{-}OH \tag{II-1}$$

wherein each of $R^{211}$ and $R^{212}$ is the same as $R^{21}$ described above; and n211 is the same as n21 described above.

[Ether Diol (I-1)]

The ether diol (I-1) for use in the production of the polycarbonate diol composition of the present embodiment can be any compound having a structure represented by the general formula (I-1). Among others, the ether diol (I-1) is preferably polyoxyalkylene diol having primary hydroxy group at both ends. Products having various molecular weights are commercially available as the ether diol (I-1), and such a commercially available product may be used. Examples of the commercially available product of the ether diol (I-1) include, but are not particularly limited to, poly-oxyalkylene diols such as "Newpol" series, "Primepol" series, and "Sunnix" series manufactured by Sanyo Chemical Industries, Ltd., "Plonon" series manufactured by NOF Corp., "Preminol" and "Excenol" series manufactured by AGC Inc., and "PTMG" series manufactured by Mitsubishi Chemical Corp.

The number-average molecular weight of the ether diol (I-1) is not particularly limited and is preferably 400 or higher and 3000 or lower, more preferably 600 or higher and 2000 or higher. When the number-average molecular weight of the ether diol (I-1) for use in production is equal to or more than the lower limit value described above, the amount of the raw material ether diol (I-1) used can be further reduced. Furthermore, polyurethane obtained from the poly-carbonate diol composition of the present embodiment tends to have better moist heat resistance and chemical resistance. When the number-average molecular weight of the ether diol (I-1) for use in production is equal to or less than the upper limit value described above, the crystallinity of the polycarbonate diol composition of the present embodiment tends to be further suppressed.

[Polycarbonate Diol (II-1)]

The polycarbonate diol (II-1) for use in the production of the polycarbonate diol composition of the present embodiment can be any compound having a structure represented by the general formula (II-1). A method for producing the polycarbonate diol (II-1) is not particularly limited, and a method known in the art may be adopted. The polycarbonate diol (II-1) can be obtained, for example, through the reaction of a carbonate compound with a diol compound in the presence of a transesterification catalyst.

(Carbonate Compound)

Examples of the carbonate compound for use in the production of the polycarbonate diol(II-1) include, but are not limited to, alkylene carbonate, dialkyl carbonate, and diaryl carbonate.

Examples of the alkylene carbonate include, but are not particularly limited to, ethylene carbonate, trimethylene carbonate, 1,2-propylene carbonate, 1,2-butylene carbonate, 1,3-butylene carbonate, and 1,2-pentylene carbonate.

Examples of the dialkyl carbonate include, but are not particularly limited to, dimethyl carbonate, diethyl carbonate, dipropyl carbonate, and dibutyl carbonate.

Examples of the diaryl carbonate include, but are not particularly limited to, diphenyl carbonate.

Among others, the carbonate compound for use in the production of the polycarbonate diol (II-1) is preferably alkylene carbonate, more preferably ethylene carbonate.

(Diol Compound)

Examples of the diol compound for use in the production of the polycarbonate diol (II-1) include, but are not limited to, linear diol, branched diol, cyclic diol, and diol having an aromatic ring.

Examples of the linear diol include, but are not particularly limited to, ethylene glycol, 1,3-propanediol, 1,4-bu-tanediol, 1,5-pentanediol, 1,6-hexanediol, 1,7-heptanediol, 1,8-octanediol, 1,9-nonanediol, 1,10-decanediol, 1,11-unde-canediol, and 1,12-dodecanediol.

Examples of the branched diol include, but are not par-ticularly limited to, 2-methyl-1,8-octanediol, neopentyl gly-col, 2-ethyl-1,6-hexanediol, 2-methyl-1,3-propanediol, 3-methyl-1,5-pentanediol, 2,4-dimethyl-1,5-pentanediol, and 2,4-diethyl-1,5-pentanediol.

Examples of the cyclic diol include, but are not particu-larly limited to, 1,3-cyclohexanediol, 1,4-cyclohexanediol, 1,4-cyclohexanedimethanol, and 2-bis(4-hydroxycyclo-hexyl)-propane.

Examples of the diol having an aromatic ring include, but are not particularly limited to, p-xylenediol, p-tetrachlorox-ylenediol, 1,4-bis(hydroxyethoxy)benzene, 2,2-bis[(4-hy-droxyethoxy)phenyl]propane.

Among others, linear or branched diol having 3 or more and 10 or less carbon atoms is preferred, 1,4-butanediol, 1,5-pentanediol or 1,6-hexanediol is more preferred, and 1,4-butanediol or 1,6-hexanediol is still more preferred.

[Production Conditions for Polycarbonate Diol Composition and Polycarbonate Diol (II-1)]

For the production of the raw material polycarbonate diol (II-1), a transesterification reaction catalyst can be used. The catalyst can be selected from usual transesterification reac-tion catalysts.

Examples of the transesterification reaction catalyst include, but are not particularly limited to, alkali metals and alkaline earth metals, and alcoholates thereof, hydrides thereof, oxides thereof, amides thereof, hydroxides thereof and salts thereof.

Examples of the salts of the alkali metal and the alkaline earth metal include, but are not particularly limited to, carbonate, nitrogen-containing borate, and basic salts with organic acids.

Examples of the alkali metal include, but are not particu-larly limited to, lithium, sodium, and potassium.

Examples of the alkaline earth metal include, but are not particularly limited to, magnesium, calcium, strontium, and barium.

Examples of the transesterification catalyst using a metal other than alkali metals and alkaline earth metals include, but are not particularly limited to, metals other than alkali metals and alkaline earth metals, and salts thereof, alcoho-lates thereof, and organic compounds containing the metals.

Specific examples of the metal other than alkali metals and alkaline earth metals include, but are not particularly limited to, aluminum, titanium, vanadium, chromium, man-ganese, iron, cobalt, nickel, copper, zinc, gallium, germa-nium, zirconium, niobium, molybdenum, ruthenium, rho-dium, palladium, silver, indium, tin, antimony, tungsten, rhenium, osmium, iridium, platinum, gold, thallium, lead, bismuth, and ytterbium.

One of these transesterification catalysts can be used singly, or two or more thereof can be used in combination.

Among others, the transesterification reaction catalyst is preferably at least one metal selected from the group con-sisting of sodium, potassium, magnesium, potassium, tita-nium, zirconium, tin, lead and ytterbium, or a salt thereof, an alkoxide thereof, or an organic compound containing the metal, because transesterification reaction to obtain the polycarbonate diol is more favorably performed, and use of the resulting polycarbonate diol has less influence on ure-thane reaction.

The transesterification reaction catalyst is more preferably at least one metal selected from the group consisting of magnesium, titanium, ytterbium, tin and zirconium.

Specific examples of the preferred transesterification cata-lyst include, but are not particularly limited to, organic compounds of magnesium, organic compounds of lead, and organic compounds of titanium.

Examples of the organic compound of magnesium include, but are not particularly limited to, magnesium acetate tetrahydrate and magnesium acetate anhydride.

Examples of the organic compound of lead include, but are not particularly limited to, lead acetate trihydrate, tetraphenyl lead, and lead stearate.

Examples of the organic compound of titanium include, but are not particularly limited to, titanium tetra-n-butoxide, titanium tetra-n-propoxide, and titanium tetraisopropoxide.

The amount of the transesterification reaction catalyst used is preferably 0.00001% by mass or more and 0.1% by mass or less, more preferably 0.0001% by mass or more and 0.05% by mass or less, based on the total mass of the raw materials.

The transesterification catalyst used in transesterification reaction is not consumed by the transesterification reaction when heat treatment is performed subsequently to the production of the polycarbonate diol. Therefore, its amount can be calculated on the basis of the amount of the transesterification reaction catalyst used. In the case of using, for example, commercially available polycarbonate diol, the amount of a metal of the transesterification reaction catalyst contained in the polycarbonate diol is determined by ICP (inductively coupled plasma) measurement.

The polycarbonate diol (II-1) for use in the production of the polycarbonate diol composition of the present embodiment may be supplemented with a catalyst poison such as a phosphoric acid ester compound in order to deactivate the transesterification reaction catalyst used in the production thereof.

When the raw material polycarbonate diol (II-1) contains a catalyst poison for the transesterification reaction catalyst, etc. used in the production thereof, the transesterification reaction of the ether diol (I-1) with the polycarbonate diol (II-1) usually tends to be less likely to progress. Hence, for the production of the polycarbonate diol composition of the present embodiment, the transesterification reaction catalyst described above can be newly added in a necessary amount.

On the other hand, when the raw material polycarbonate diol (II-1) contains no catalyst poison for the transesterification reaction catalyst, the transesterification reaction according to the present embodiment usually tends to be more likely to progress. However, in the case of, for example, further lowering a reaction temperature or further shortening a reaction time in the process of producing the polycarbonate diol composition of the present embodiment, the transesterification reaction catalyst can also be newly added in a necessary amount. In this case, the same transesterification reaction catalyst as that used in the production of the raw material polycarbonate diol (II-1) can be adopted.

The polycarbonate diol (II-1) for use in the production of the polycarbonate diol composition of the present embodiment may be homo polycarbonate diol obtained from one diol compound, or may be a copolymeric polycarbonate diol obtained from two or more diol compounds.

Use of any of the above-listed polycarbonate diols (II-1) can produce the polycarbonate diol composition through transesterification reaction with the ether diol (I-1).

However, for example, homo polycarbonate diol obtained using 1,6-hexanediol, which is widely used on the market, is usually a solid at ordinary temperature. Hence, a polycarbonate diol composition obtained through the transesterification reaction of the homo polycarbonate diol with the ether diol (I-1) tends to be also a solid at ordinary temperature.

On the other hand, for example, copolymeric polycarbonate diol obtained using any two types of 1,4-butanediol, 1,5-pentanediol and 1,6-hexanediol is a liquid at ordinary temperature. Hence, a polycarbonate diol composition obtained through the transesterification reaction of the copolymeric polycarbonate diol with the ether diol (I-1) tends to be also a liquid at ordinary temperature.

The number-average molecular weight of the polycarbonate diol (II-1) for use in the production of the polycarbonate diol composition of the present embodiment is not particularly limited and is preferably 500 or higher and 5000 or lower, more preferably 1000 or higher and 3000 or lower.

When the number-average molecular weight of the polycarbonate diol (II-1) is equal to or more than the lower limit value described above, performance expected for the polycarbonate diol composition tends to be better. On the other hand, when the number-average molecular weight of the polycarbonate diol (II-1) is equal to or less than the upper limit value described above, the polycarbonate diol composition can be more effectively prevented from having a higher viscosity. Thus, handleability tends to be better.

The method for producing the polycarbonate diol composition of the present embodiment is not particularly limited and is preferably production through transesterification reaction using the ether diol (I-1) and the polycarbonate diol (II-1).

Specifically, the transesterification reaction can be carried out by mixing ether diol (I-1) with the polycarbonate diol (II-1), and stirring the mixture under heating.

The temperature of the transesterification reaction is not particularly limited and is preferably 120° C. or higher and 200° C. or lower, more preferably 140° C. or higher and 180° C. or lower.

When the reaction temperature is equal to or higher than the lower limit value described above, the transesterification reaction can be performed in a shorter time, leading to excellent cost efficiency. When the reaction temperature is equal to or lower than the upper limit value described above, the resulting polycarbonate diol composition can be more effectively prevented from being stained.

The reaction pressure of the transesterification reaction is not particularly limited and is preferably atmospheric pressure or higher and 1 MPa or lower. When the reaction pressure falls within the range described above, the reaction can be more conveniently carried out. In the case of using an auxiliary material, the transesterification reaction can be more efficiently accelerated at a pressure increased to some extent in consideration of vapor pressure thereof, etc.

[Area Ratio (%) of Number-Average Molecular Weight of 1000 or Lower]

The area ratio (%) of a number-average molecular weight of 1000 or lower in molecular weight calculation results obtained by calculation by GPC measurement as to the polycarbonate diol composition used in the present embodiment is preferably 7% or less, more preferably 6% or less. The lower limit value of the area ratio (%) of the number-average molecular weight of 1000 or lower is not particularly limited and is, for example, 0.5%. When the area ratio (%) of the number-average molecular weight of 1000 or lower falls within the range described above, the resulting polyurethane tends to have much better flexibility. The method for controlling the number-average molecular weight of the polycarbonate diol composition preferably involves, for example, performing transesterification reaction and depolymerization at the same time using the polycarbonate diol (II-1) and the ether diol (I-1) in the presence of a small amount of the raw material diol for the polycarbonate diol (II-1), or performing transesterification reaction in the presence of one type or two or more types of ether diols (I-1).

The progression and completion of the transesterification reaction can be confirmed by GPC measurement. As the transesterification reaction progresses, a peak derived from the raw material ether diol (I-1) is decreased in height or area over time. From the disappearance of the peak, it can be confirmed that a structure derived from the ether diol (I-1) is bonded to the end or inside the polymer chain of the raw material polycarbonate diol (II-1).

In the method for producing the polycarbonate diol composition of the present embodiment, for example, the step of dehydrating the raw materials used may be performed as pretreatment before the transesterification reaction described above.

In the method for producing the polycarbonate diol composition of the present embodiment, for example, the step of adding the aforementioned catalyst poison for the transesterification reaction catalyst may be performed as aftertreatment after the transesterification reaction described above.

The polycarbonate diol composition of the present embodiment may also contain the raw materials ether diol (I-1) and polycarbonate diol (II-1). In the polycarbonate diol composition of the present embodiment, the contents of these compounds are arbitrary and are preferably 1% by mass or more and 99% by mass or less, more preferably 5% by mass or more and 95% by mass or less, further preferably 10% by mass or more and 80% by mass or less. The polycarbonate diol composition may further contain the raw material diol compound for the polycarbonate diol (II-1) without hindering effects. As for a measurement method, these compounds can be measured by LC-MS measurement.

[Purpose]

The polycarbonate diol composition of the present embodiment can be used as a raw material of a polyurethane for reaction with polyisocyanate. The polyurethane is excellent in chemical resistance, heat resistance, and weather resistance and can therefore be widely used in foams, elastomers, coating materials, coating agents, pressure-sensitive adhesives, adhesives, artificial leather, synthetic leather, aqueous polyurethane coating materials, and the like. Further, the polyurethane can be used for a purpose such as a polyester or polyimide modifier.

[Polyurethane]

The polyurethane of the present embodiment is prepared using the polycarbonate diol composition mentioned above.

The method for producing the polyurethane of the present embodiment usually employs polyurethanization reaction conditions known in the art for producing polyurethane.

Examples thereof include a method of mixing the polycarbonate diol composition mentioned above, other polyols, polyisocyanate and a chain extender in one lump for reaction (hereinafter, also referred to as a "one-shot method"), and a method of first reacting the polycarbonate diol composition mentioned above, other polyols and polyisocyanate to prepare a prepolymer having isocyanate groups at both ends, and then reacting the prepolymer with a chain extender (hereinafter, also referred to as a "prepolymer method").

The isocyanate compound contained in the polyurethane of the present embodiment is not particularly limited as long as the compound works as a curing agent. A compound having two or more terminal isocyanate groups is used.

Examples of such an isocyanate compound include, but are not particularly limited to, chain aliphatic diisocyanate, cyclic aliphatic diisocyanate, aromatic diisocyanate, and isocyanate compounds having three or more isocyanate groups, and isocyanurate-modified products and biuret-modified products of these isocyanate compounds.

Examples of the chain aliphatic diisocyanate include, but are not particularly limited to, hexamethylene diisocyanate and trimethylhexamethylene diisocyanate.

Examples of the cyclic aliphatic diisocyanate include, but are not particularly limited to, isophorone diisocyanate.

Examples of the aromatic diisocyanate include, but are not particularly limited to, tolylene diisocyanate, 4,4'-diphenylmethane diisocyanate (hereinafter, also abbreviated to "MDI"), xylylene diisocyanate and naphthylene diisocyanate.

Examples of the isocyanate compound having three or more isocyanate groups include, but are not particularly limited to, triphenylmethane-4,4'-4"-triisocyanate, 1,3,5-triisocyanatobenzene, 2,4,6-triisocyanatotoluene and 4,4'-dimethyldiphenylmethane-2,2',5,5'-tetraisocyanate.

A commercially available product may be used as the isocyanate compound, or the isocyanate compound may be synthesized by use of a method known in the art.

The content of the isocyanate compound can be appropriately adjusted according to the molar quantity of a hydroxy group in the base agent polyol. Specifically, the molar ratio (NCO/OH) of an isocyanate group in the isocyanate compound to a hydroxy group in the polycarbonate diol can be, for example, 0.2 or more and 5.0 or less, can be, for example, 0.4 or more and 3.0 or less, and can be, for example, 0.5 or more and 2.0 or less. When NCO/OH is equal to or more than the lower limit value described above, a stronger coating film tends to be obtained. On the other hand, when NCO/OH is equal to or less than the upper limit value described above, the smoothness of a coating film tends to be better.

Examples of the chain extender for use in producing the polyurethane of the present embodiment can usually include, but are not particularly limited to, polyol and polyamine.

Examples of the polyol include, but are not particularly limited to, linear diol, branched diol, cyclic diol, and diol having an aromatic ring.

Examples of the linear diol include, but are not particularly limited to, ethylene glycol, 1,3-propanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol.

Examples of the branched diol include, but are not particularly limited to, 2-methyl-1,8-octanediol, neopentyl glycol, 2-ethyl-1,6-hexanediol, 2-methyl-1,3-propanediol, 3-methyl-1,5-pentanediol, 2,4-dimethyl-1,5-pentanediol, and 2,4-diethyl-1,5-pentanediol.

Examples of the cyclic diol include, but are not particularly limited to, 1,3-cyclohexanediol, 1,4-cyclohexanediol, 1,4-cyclohexanedimethanol, and 2-bis(4-hydroxycyclohexyl)-propane.

Examples of the diol having an aromatic ring include, but are not particularly limited to, p-xylenediol, p-tetrachloroxylenediol, 1,4-bis(hydroxyethoxy)benzene, and 2,2-bis[(4-hydroxyethoxy)phenyl]propane.

Examples of the polyamine include, but are not particularly limited to, hydroxyamines and polyamines.

Examples of the hydroxyamines include, but are not particularly limited to, N-methylethanolamine and N-ethylethanolamine.

Examples of the polyamines include, but are not particularly limited to, ethylenediamine, 1,3-diaminopropane, hexamethylenediamine, triethylenetetramine, diethylenetriamine, isophoronediamine, 4,4'-diaminodicyclohexylmethane, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, 4,4'-diphenylmethanediamine, methylenebis(o-chloroaniline), xylylenediamine, diphenyl-diamine, tolylenediamine, hydrazine, piperazine, and N,N'-diaminopiperazine.

These chain extenders may be used singly or may be used in combination of two or more thereof.

The synthetic leather of the present embodiment may be a synthetic leather comprising a base fabric, an adhesive layer, an intermediate layer and a surface skin layer laminated in order and comprises the polyurethane mentioned above. In the synthetic leather of the present embodiment, the polyurethane mentioned above is preferably contained in the adhesive layer and/or the intermediate layer. The synthetic leather of the present embodiment comprising the polyurethane mentioned above enables the amount of an organic solvent to be reduced for use in production and is therefore preferred.

[Coating Material or Coating Agent Composition]

The coating material or coating agent composition (coating material) of the present embodiment is prepared using the polycarbonate diol composition mentioned above.

A production method known in the art is used as a method for producing the coating material or coating agent composition (coating material) using the polycarbonate diol composition mentioned above. Examples of such a composition that can be produced include: a two-component solvent-based coating composition in which a coating material base agent obtained from the polycarbonate diol composition mentioned above is mixed with a curing agent made of polyisocyanate immediately before coating; a one-component solvent-based coating composition consisting of a urethane polymer having a terminal isocyanate group obtained by reacting the polycarbonate diol mentioned above with polyisocyanate; and a one-component solvent-based coating composition consisting of a polyurethane resin obtained by reacting the polycarbonate diol mentioned above, organic polyisocyanate and a chain extender.

The coating material or coating agent composition (coating material) of the present embodiment can be supplemented with other additives, for example, a curing accelerator (catalyst), a leveling agent, a filler, a dispersant, a flame retardant, a dye, an organic or inorganic pigment, a mold release agent, a rheology modifier, a plasticizer, an antioxidant, an ultraviolet absorber, a light stabilizer, an antifoaming agent, a colorant, and a solvent, according to various purposes. A coating material composition differing in nature, such as a soft-feel coating material and a clear coating material, can be obtained by appropriately containing these other additives.

Examples of the curing accelerator (catalyst) include, but are not particularly limited to, those generally used such as monoamine, diamine, triamine, cyclic amine, alcohol amine, ether amine, and metal catalysts.

Examples of the monoamine include, but are not particularly limited to, triethylamine and N,N-dimethylcyclohexylamine. Examples of the diamine include, but are not particularly limited to, tetramethylethylenediamine.

Examples of the alcohol amine include, but are not particularly limited to, dimethylethanolamine.

Examples of the metal catalyst include, but are not particularly limited to, potassium acetate, potassium 2-ethylhexanoate, calcium acetate, lead octylate, dibutyltin dilaurate, tin octylate, bismuth neodecanoate, bismuth oxycarbonate, bismuth 2-ethylhexanoate, zinc octylate, zinc neodecanoate, phosphine, and phosphorine.

Specific examples of the organic solvent include, but are not particularly limited to, amide solvents, sulfoxide solvents, ketone solvents, ether solvents, ester solvents, carbonic acid ester solvents, and aromatic hydrocarbon solvents.

These organic solvents may be used singly or may be used as a mixed solvent of two or more thereof.

EXAMPLES

Hereinafter, the present embodiment will be described further specifically with reference to specific Examples and Comparative Examples. However, the present embodiment is not limited by these Examples and Comparative Examples by any means without departing from the spirit of the present invention. In the present Examples, the terms "parts" and "%" are based on mass, unless otherwise specified.

Physical properties and evaluation in Examples and Comparative Examples mentioned later were measured and performed by the following methods.

[Physical Property 1] Hydroxy Value

The hydroxy value of polycarbonate diol (composition) was measured by the following method.

First, a volumetric flask was used, and pyridine was added to 12.5 g of acetic anhydride so as to bring the amount to 50 mL, to prepare an acetylation reagent. Subsequently, in a 100 mL eggplant-shaped flask, 2.5 g of a sample was weighed. Subsequently, to the eggplant-shaped flask, 5 mL of the acetylation reagent and 10 mL of toluene were added with a whole pipette. Then, a condenser was attached to the flask, and the solution in the eggplant-shaped flask was stirred and heated at 100° C. for 1 hour. Subsequently, to the eggplant-shaped flask, 2.5 mL of distilled water was added with a whole pipette, and then, the solution in the eggplant-shaped flask was further heated and stirred for 10 minutes. After cooling of the solution in the eggplant-shaped flask for 2 to 3 minutes, to the eggplant-shaped flask, 12.5 mL of ethanol was added. Subsequently, to the eggplant-shaped flask, 2 to 3 drops of phenolphthalein were added as an indicator, followed by titration with 0.5 mol/L ethanolic potassium hydroxide. Subsequently, in a 100 mL eggplant-shaped flask, 5 mL of the acetylation reagent, 10 mL of toluene and 2.5 mL of distilled water were placed, and the solution in the eggplant-shaped flask was heated and stirred for 10 minutes, followed by titration in the same way as above (blank test). On the basis of the results, the hydroxy value of the polycarbonate diol (composition) was calculated according to the following expression (i):

$$\text{Hydroxy value(mg-KOH/g)}=\{(F-E)\times28.05\times f\}/G \qquad \text{(i)}$$

In the expression (i), E represents the amount of the sample titrated (mL); F represents the amount titrated (mL) in the blank test; G represents the mass of the sample (g); and f represents the factor of the titration solution.

[Physical Property 2] Number-Average Molecular Weight (A)

The number-average molecular weight (A) of polycarbonate diol (composition) was calculated from the hydroxy value determined in [Physical property 1] according to the following expression (ii):

$$\text{Number-average molecular weight}(A)=2/(H\times10^{-3}/56.11) \qquad \text{(ii)}$$

In the expression (ii), H represents the hydroxy value (mg-KOH/g) of the polycarbonate diol (composition).

[Physical Property 3] Number-Average Molecular Weight (B) (Gel Permeation Chromatography (GPC) Measurement)

The concentration of a polycarbonate diol composition was adjusted to 0.2% by mass with tetrahydrofuran (hereinafter, referred to as THF) to obtain a sample. The number-average molecular weight (B) of the polycarbonate diol composition based on standard polystyrene was measured as to the obtained sample using a GPC apparatus given below. Then, the area ratio (%) of a number-average molecular weight (Mn) of 1000 or lower was determined from the molecular weight calculation results of the polycarbonate diol composition.

GPC apparatus: HLC-8320 manufactured by Tosoh Corp.
Column: One column of TSKgel G4000H
    One column of G3000H
    Two columns of G2000H
Eluent: Tetrahydrofuran (THF)
Flow rate: 1.0 mL/min
Column temperature: 40° C.
RI detector: RI (apparatus: built-in HLC-8320)

[Physical Property 4] Measurement of Melt Viscosity

A polycarbonate diol composition was preheated to 50° C. Then, the melt viscosity of the polycarbonate diol composition was measured at 50° C. using a type E viscometer (manufactured by Toki Sangyo Co., Ltd., TVE-22HT, cone: No. 6).

[Physical Property 5] Measurement of Glass Transition Temperature (Tg)

Approximately 10 g of a polycarbonate diol composition was enclosed in an aluminum pan. A temperature elevation and lowering operation was performed from 30° C. to 100° C. at a rate of 20° C./min, from 100° C. to –100° C. at a rate of 5° C./min, and from –100° C. to 100° C. at a rate of 5° C./min in a nitrogen atmosphere using a differential scanning calorimeter (DSC7000X, manufactured by Hitachi High-Tech Science Corp.). The point of inflection at the time of the second temperature elevation was determined as the glass transition temperature (Tg).

[Physical Property 6] Confirmation of State of Polycarbonate Diol Composition

A polycarbonate diol composition heated to 80° C. was placed in a transparent sample bottle, and a state cooled to 23° C. was visually observed. When the polycarbonate diol composition had flowability, even if slightly, by tilting the sample bottle, this composition was confirmed to be liquid.

[Physical Property 7] Average Value of the Number of Repeats (n11) in Structure (I) and Average Value of the Number of Repeats (n21) in Polycarbonate Structure (II) in Polycarbonate Diol The average values of n11 and n21 were determined by isolating the raw material diol component through the alkali decomposition of a polycarbonate diol composition, and subjecting the component to GC-MS measurement, LC-MS measurement and gel permeation chromatography (GPC) measurement.

[Evaluation 1] Glass Transition Temperature (Tg) of Polyurethane

A test specimen having a width of 10 mm, a length of 40 mm, and a thickness of 0.4 mm was cut out of a polyurethane film. The test specimen was loaded at a distance between chucks of 20 mm in a viscoelasticity measurement apparatus (manufactured by Hitachi High-Tech Science Corp., [TA7000 series, DMA7100]). Viscoelasticity was measured while the temperature was elevated from –100° C. to 100° C. at 5° C./min. The peak of tan δ was read from the measurement results to determine the glass transition temperature (Tg) of the polyurethane.

[Evaluation 2] Tensile Test at Ordinary Temperature

A strip of a test specimen having a width of 10 mm, a length of 100 mm, and a thickness of approximately 0.1 mm was prepared from a polyurethane film in accordance with JIS K6301 (2010). A tensile test was conducted as to the prepared test specimen at a temperature of 23° C. (relative humidity: 55%) at a distance between chucks of 20 mm and a pulling rate of 100 mm/min using a tensile tester (manufactured by Orientec Co., Ltd., product name "Tensilon, model RTE-1210"). Stress when the test specimen was stretched by 100% (100% modulus) was measured. A lower 100% modulus was evaluated as better flexibility.

[Evaluation 3] Tensile Test at Low Temperature

A strip of a test specimen having a width of 10 mm, a length of 100 mm, and a thickness of approximately 0.1 mm was prepared from a polyurethane film in accordance with JIS K6301 (2010). The prepared test specimen was loaded at a distance between chucks of 20 mm in a tensile tester (manufactured by Orientec Co., Ltd., product name "Tensilon, model RTE-1210") with a thermostat bath (manufactured by Orientec Co., Ltd., "model TLF-R3T-E-W"). Subsequently, the test specimen was left standing at –20° C. for 5 minutes. Then, the tensile test of the test specimen was conducted at a pulling rate of 100 mm/min. Stress when the test specimen was stretched by 100% (100% modulus) was measured. A lower 100% modulus was evaluated as better flexibility.

[Evaluation 4] Chemical Resistance Test (Oleic Acid Resistance Test)

Oleic acid resistance was evaluated as chemical resistance using oleic acid.

A 1 cm×10 cm test specimen was cut out of a polyurethane film. The mass of the test specimen was measured with a precision balance. Then, the test specimen was added to a glass tray (capacity: 250 mL) containing 50 mL of oleic acid as a test solvent and left standing for 24 hours in a thermostat bath of 80° C. in a nitrogen atmosphere. After the test, the test specimen was taken out thereof, and the front and the back thereof were lightly wiped with a paper wiper, followed by mass measurement with a precision balance. The rate of change in mass (rate of increase (rate of swelling (%)) was calculated. A rate of change in mass closer to 0% indicates more favorable oleic acid resistance.

[Evaluation 5] Evaluation of Moist Heat Resistance

A strip of a sample having a width of 10 mm, a length of 100 mm, and a thickness of approximately 100 μm was prepared from a polyurethane film. The prepared sample was heated under conditions involving a temperature of 85° C. and a humidity of 85% for 10 days in a thermo-hygrostat manufactured by ESPEC Corp. under product name of "PL-1J". The breaking strength of the sample thus heated was measured in the same manner as in <Tensile test at ordinary temperature> described above, and the retention (%) thereof was determined.

$$Retention = Breaking\ strength\ after\ heating/Breaking\ strength\ before\ heating \times 100$$

[Evaluation 6] Evaluation of Heat Resistance

A strip of a sample having a width of 10 mm, a length of 100 mm, and a thickness of approximately 100 μm was prepared from a polyurethane film. The prepared sample was heated at a temperature of 120° C. for 7 days in a multiple safety oven manufactured by Futaba Kagaku K.K. under product name of "MSO-45TP". The breaking strength of the sample thus heated was measured in the same manner as in <Tensile test at ordinary temperature> described above, and the retention (%) thereof was determined.

$$Retention = Breaking\ strength\ after\ heating/Breaking\ strength\ before\ heating \times 100$$

[Evaluation 7] Evaluation of Coating Film Formability

A necessary number of peelable paper pressure-sensitive tapes was attached as spacers to both ends of a glass plate (JIS R3202, 2 mm×100 mm×150 mm). Subsequently, each coating material composition produced on the basis of Application Examples mentioned later was added dropwise to the upper part of the glass plate, which was then coated using a glass rod (diameter: 8 mm) such that a dry film thickness was 30 to 40 μm. Subsequently, the resulting coating was cured at 23° C. in a 50% RH atmosphere for 15 minutes. Subsequently, the coating was dried by baking at 140° C. for 20 minutes to obtain a coating film.

<Evaluation Criteria>

○: Indicating smooth coating film surface

Δ: Indicating slightly observed streaks, asperities, and/or cissing on coating film surface x: Indicating slightly observed streaks, asperities, and/or cissing on coating film surface In tables and the specification, abbreviations are as follows.

E-1: Polyoxypropylene glycol (manufactured by Sanyo Chemical Industries, Ltd., "Newpol PE-61" (trade name), number-average molecular weight: approximately 2000, ratio of a structure having a divalent linear and/or branched aliphatic hydrocarbon group having 3 carbon atoms: 88%)

E-2: Polyoxytetramethylene glycol (manufactured by Mitsubishi Chemical Corp., "PTMG2000" (trade name), number-average molecular weight: approximately 2000, ratio of a structure having a divalent linear and/or branched aliphatic hydrocarbon group having 3 carbon atoms: 0%)

E-3: Polyoxypropylene glycol (manufactured by FUJIF-ILM Wako Pure Chemical Corp., Polypropylene glycol, Diol Type, 2,000 (trade name), number-average molecular weight: approximately 2000, ratio of a structure having a divalent linear and/or branched aliphatic hydrocarbon group having 3 carbon atoms: 100%)

E-4: Polyoxytetramethylene glycol (manufactured by BASF SE, PolyTHF250 (trade name), number-average molecular weight: 250, ratio of a structure having a divalent linear and/or branched aliphatic hydrocarbon group having 3 carbon atoms: 0%)

E-5: Polyoxytetramethylene glycol (manufactured by Mitsubishi Chemical Corp., "PTMG850" (trade name), number-average molecular weight: 850, ratio of a structure having a divalent linear and/or branched aliphatic hydrocarbon group having 3 carbon atoms: 0%)

E-6: Polyoxypropylene glycol (manufactured by NOF Corp., "Plonon #102" (trade name), number-average molecular weight: approximately 1250, ratio of a structure having a divalent linear and/or branched aliphatic hydrocarbon group having 3 carbon atoms: 90%)

[Synthesis Example 1] Production of Polycarbonate Diol P-1

A 1 L glass flask (hereinafter, also referred to as a "reactor") equipped with a rectifying column packed with a regular packing material, and a stirring apparatus was charged with 230 g of 1,5-pentanediol, 250 g of 1,6-hexanediol, and 400 g of ethylene carbonate. Then, 0.0468 g of titanium tetra-n-butoxide was placed therein as a catalyst. While the reactor was dipped in an oil bath of 180° C. and a portion of the distillate was extracted, the mixture was reacted at a reaction temperature of 165° C. for 12 hours. Subsequently, the reactor was connected directly to a condenser. The temperature of the oil bath was raised to 180° C. Then, the pressure was gradually lowered, and the reaction was further performed for 3 hours to obtain polycarbonate diol P-1 (466 g) which was liquid at ordinary temperature. The hydroxy value of the obtained polycarbonate diol P-1 was 55.2 mgKOH/g. The number-average molecular weight of the obtained polycarbonate diol P-1 was 2033.

[Synthesis Example 2] Production of Polycarbonate Diol P-2

A 1 L glass flask (hereinafter, also referred to as a "reactor") equipped with a rectifying column packed with a regular packing material, and a stirring apparatus was charged with 270 g of 1,6-hexanediol, 250 g of 1,4-butanediol, and 445 g of ethylene carbonate. Then, 0.0960 g of titanium tetra-n-butoxide was placed therein as a catalyst. While the reactor was dipped in an oil bath of 140 to 160° C. and a portion of the distillate was extracted, the mixture was reacted at a reaction temperature of 90 to 160° C. for 20 hours. Subsequently, the reactor was connected directly to a condenser. The temperature of the oil bath was raised to 180° C. Then, the pressure was gradually lowered, and the reaction was further performed for 8 hours to obtain polycarbonate diol P-2 (462 g) which was liquid at ordinary temperature. The hydroxy value of the obtained polycarbonate diol P-2 was 55.8 mgKOH/g. The number-average molecular weight of the obtained polycarbonate diol P-2 was 2010.

[Synthesis Example 3] Production of Polycarbonate Diol P-3

A 3 L glass flask (hereinafter, also referred to as a "reactor") equipped with a rectifying column packed with a regular packing material, and a stirring apparatus was charged with 550 g of 2-methyl-1,3-propanediol, 423 g of 1,4-butanediol, and 952 g of ethylene carbonate. Then, 0.1925 g of titanium tetra-n-butoxide was placed therein as a catalyst. While the reactor was dipped in an oil bath of 170° C. and a portion of the distillate was extracted, the mixture was reacted at a reaction temperature of 155° C. for 25 hours. Subsequently, the reactor was connected directly to a condenser. The temperature of the oil bath was raised to 170° C. Then, the pressure was gradually lowered, and the reaction was further performed for 5 hours to obtain polycarbonate diol P-3 (577 g) which was liquid at ordinary temperature.

The hydroxy value of the obtained polycarbonate diol P-3 was 53.0 mgKOH/g. The number-average molecular weight of the obtained polycarbonate diol P-3 was 2117.

[Synthesis Example 4] Production of Polycarbonate Diol P-4

A 3 L glass flask (hereinafter, also referred to as a "reactor") equipped with a rectifying column packed with a regular packing material, and a stirring apparatus was charged with 383 g of 1,3-propanediol and 444 g of ethylene carbonate. Then, 0.040 g of titanium tetra-n-butoxide was placed therein as a catalyst. While the reactor was dipped in an oil bath and a portion of the distillate was extracted, the mixture was reacted at a reaction temperature of 160 to 175° C. for 18 hours. Subsequently, the reactor was connected directly to a condenser. The temperature of the oil bath was raised to 185° C. Then, the pressure was gradually lowered, and the reaction was further performed for 6 hours to obtain polycarbonate diol P-4 (290 g) which was liquid at ordinary temperature.

The hydroxy value of the obtained polycarbonate diol P-4 was 56.2 mgKOH/g. The number-average molecular weight of the obtained polycarbonate diol P-4 was 1996.

[Synthesis Example 5] Production of Polycarbonate Diol P-5

A 1 L glass flask (hereinafter, also referred to as a "reactor") equipped with a rectifying column packed with a regular packing material, and a stirring apparatus was charged with 255 g of 3-methyl-1,5-petanediol, 254 g of 1,6-hexanediol, and 380 g of ethylene carbonate. Then, 0.0468 g of titanium tetra-n-butoxide was placed therein as a catalyst. While the reactor was dipped in an oil bath of 180° C. and a portion of the distillate was extracted, the mixture was reacted at a reaction temperature of 165° C. for 12 hours. Subsequently, the reactor was connected directly to a condenser. The temperature of the oil bath was raised to 180° C. Then, the pressure was gradually lowered, and the reaction was further performed for 3 hours to obtain polycarbonate diol P-5 (466 g) which was liquid at ordinary temperature. The hydroxy value of the obtained polycarbonate diol P-5 was 56.4 mgKOH/g. The number-average molecular weight of the obtained polycarbonate diol P-5 was 1989.

[Synthesis Example 6] Production of Polycarbonate Diol P-6

A 1 L glass flask (hereinafter, also referred to as a "reactor") equipped with a rectifying column packed with a regular packing material, and a stirring apparatus was charged with 335 g of 1,4-butanediol, 195 g of 1,10-decanediol, and 405 g of dimethyl carbonate. Then, 0.0936 g of titanium tetra-n-butoxide was placed therein as a catalyst. While the reactor was dipped in an oil bath of 170° C. and a portion of the distillate was extracted, the mixture was reacted at a reaction temperature of 160° C. for 10 hours. Subsequently, the reactor was connected directly to a condenser. The temperature of the oil bath was raised to 185° C. Then, the pressure was gradually lowered, and the reaction was further performed for 2 hours to obtain polycarbonate diol P-6 (399 g) which was waxy (solid) at ordinary temperature. The hydroxy value of the obtained polycarbonate diol P-6 was 56.3 mgKOH/g. The number-average molecular weight of the obtained polycarbonate diol P-6 was 1992.

[Synthesis Example 7] Production of Polycarbonate Diol P-7

A 1 L glass flask (hereinafter, also referred to as a "reactor") equipped with a rectifying column packed with a regular packing material, and a stirring apparatus was charged with 536 g of 1,6-hexanediol and 400 g of ethylene carbonate. Then, 0.0475 g of titanium tetra-n-butoxide was placed therein as a catalyst. While the reactor was dipped in an oil bath of 180° C. and a portion of the distillate was extracted, the mixture was reacted at a reaction temperature of 165° C. for 12 hours. Subsequently, the reactor was connected directly to a condenser. The temperature of the oil bath was raised to 180° C. Then, the pressure was gradually lowered, and the reaction was further performed for 3 hours to obtain polycarbonate diol P-7 (468 g) which was solid at ordinary temperature. The hydroxy value of the obtained polycarbonate diol P-7 was 55.2 mgKOH/g. The number-average molecular weight of the obtained polycarbonate diol P-7 was 2033.

[Example 1] Production of Polycarbonate Diol Composition A-1

A 1 L glass flask (hereinafter, also referred to as a "reactor") equipped with a stirring apparatus was charged with 90 parts by mass (360 g) of the polycarbonate diol P-1 obtained in Synthesis Example 1, and 10 parts by mass (40 g) of polyoxypropylene glycol E-1 (manufactured by Sanyo Chemical Industries, Ltd., "Newpol PE-61" (trade name), number-average molecular weight: approximately 2000). Subsequently, the mixture was heated with stirring, and kept at approximately 145° C. in terms of the inside temperature of the reactor for 13 hours. Subsequently, dibutyl phosphate was added in an amount of 1.3 times the mass ratio of titanium tetra-n-butoxide, and the mixture was heat-treated at 115° C. in terms of the inside temperature of the reactor for 3 hours to obtain polycarbonate diol composition A-1. The progression and the like of transesterification reaction was confirmed by subjecting the reaction solution to gel permeation chromatography (hereinafter, also abbreviated to "GPC") measurement over time, and confirming the disappearance of peaks derived from the raw materials and the appearance of a peak derived from a product over time. It was also confirmed as to the finally obtained polycarbonate diol composition by GPC measurement over time that the reaction progressed substantially quantitatively on the basis of the amounts of the raw materials added, and the composition had a structure corresponding thereto.

Each physical property of the obtained polycarbonate diol composition A-1 was measured by the method described above. The results are shown in Table 1. The hydroxy value of the obtained polycarbonate diol composition A-1 was 55.5 mgKOH/g. The number-average molecular weight of the obtained polycarbonate diol composition A-1 was 2021.

Examples 2 to 19

Polycarbonate diol compositions A-2 to A-19 of Examples 2 to 19 were obtained through reaction using the same conditions and method as in Example 1 except that the type of each raw material and the amount of each raw material added were each changed as described in Tables 1 and 2. Each physical property of the obtained polycarbonate diol compositions A-2 to A-19 was measured by the method described above. The results are shown in Tables 1 and 2.

Comparative Examples 1 to 4

Polycarbonate diol compositions, etc. B-1 to B-4 of Comparative Examples 1 to 4 were obtained through reaction using the same conditions and method as in Example 1 except that the type of each raw material and the amount of each raw material added were each changed as described in Table 3. Each physical property of the obtained polycarbonate diol compositions, etc. B-1 to B-4 was measured by the method described above. The results are shown in Table 3.

TABLE 1

|  | Example 1 | Example 2 | Example 3 | Example 4 | Example 5 | Example 6 | Example 7 | Example 8 |
|---|---|---|---|---|---|---|---|---|
| Polycarbonate diol composition | A-1 | A-2 | A-3 | A-4 | A-5 | A-6 | A-7 | A-8 |
| Ether diol (I-1) | E-1 | E-1 | E-1 | E-1 | E-1 | E-1 | E-1 | E-2 |
| Polycarbonate diol (II-1) | P-1 | P-1 | P-1 | P-2 | P-2 | P-2 | P-2 | P-1 |
| Average number of repeats (n11) in structure (I) | 35.4 | 35.4 | 35.4 | 35.4 | 35.4 | 35.4 | 35.4 | 27.7 |
| Average number of repeats (n21) in polycarbonate structure (II) | 14.9 | 14.9 | 14.9 | 15.3 | 15.3 | 15.3 | 15.3 | 14.9 |
| Amount of (I-1) added [g] | 40 | 80 | 120 | 40 | 80 | 120 | 140 | 40 |
| Amount of (II-1) added [g] | 360 | 320 | 280 | 360 | 320 | 280 | 260 | 360 |
| (I-1)/(II-1) mass ratio | 10/90 | 20/80 | 30/70 | 10/90 | 20/80 | 30/70 | 35/65 | 10/90 |
| State at 23° C. | Transparent liquid | Transparent liquid | Transparent liquid | Transparent liquid | Transparent liquid | Transparent liquid | Transparent liquid | Slightly turbid liquid |
| Melt viscosity at 50° C. [mPa · s] | 9100 | 5650 | 3320 | 9380 | 6000 | 3600 | 2800 | 9820 |
| Glass transition temperature [° C.] | −56.1 | −59 | −61.2 | −55.9 | −58.9 | −60.9 | −61.8 | −58.7 |
| GPC area ratio (Mn of 1000 or lower) [%] | 5.7 | 5.3 | 5.6 | 5.5 | 5.6 | 5.3 | 5.4 | 6 |
| Hydroxy value [mgKOH/g] | 55.5 | 55.8 | 55.8 | 56.1 | 56 | 55.8 | 55.9 | 54.6 |

TABLE 2

|  | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|
| Polycarbonate diol composition | A-9 | A-10 | A-11 | A-12 | A-13 | A-14 | A-15 | A-16 | A-17 | A-18 | A-19 |
| Ether diol (I-1) | E-2 | E-3 | E-1 | E-1 | E-1 | E-1 | E-1 | E-2 | E-6 | E-6 | E-6 |
| Polycarbonate diol (II-1) | P-2 | P-2 | P-3 | P-4 | P-5 | P-6 | P-1 | P-7 | P-7 | P-1 | P-1 |
| Average number of repeats (n11) in structure (I) | 27.7 | 34.4 | 35.4 | 35.4 | 35.4 | 35.4 | 35.4 | 27.7 | 22.2 | 22.2 | 22.2 |
| Average number of repeats (n21) in polycarbonate structure (II) | 15.3 | 15.3 | 17.2 | 19.6 | 13.9 | 15.1 | 14.9 | 13.1 | 13.1 | 14.9 | 14.9 |
| Amount of (I-1) added [g] | 120 | 102 | 120 | 120 | 120 | 120 | 182 | 80 | 80 | 40 | 80 |
| Amount of (II-1) added [g] | 280 | 298 | 280 | 280 | 280 | 280 | 221 | 320 | 320 | 360 | 320 |
| (I-1)/(II-1) mass ratio | 30/70 | 25/75 | 30/70 | 30/70 | 30/70 | 30/70 | 45/55 | 20/80 | 20/80 | 10/90 | 20/80 |
| State at 23° C. | White turbid liquid | Transparent liquid | Transparent liquid | Transparent liquid | Transparent liquid | White solid | Transparent liquid | White solid | White solid | Transparent liquid | Transparent liquid |
| Melt viscosity at 50° C. [mPa · s] | 10000 | 6830 | 7160 | 7820 | 4630 | 5490 | 1650 | 9800 | 4800 | 5280 | 4750 |
| Glass transition temperature [° C.] | −63.3 | −59.2 | −46.8 | −50 | −53.4 | −53 | −62.2 | −60.1 | −60.1 | −59 | −60.2 |
| GPC area ratio (Mn of 1000 or lower) [%] | 6.1 | 7.1 | 5.8 | 5.5 | 5.9 | 5.8 | 5.3 | 6.0 | 6.3 | 6.1 | 6.2 |
| Hydroxy value [mgKOH/g] | 54.8 | 55.6 | 52.2 | 54.6 | 55.2 | 55.5 | 55.8 | 55.8 | 61.9 | 58.4 | 61.8 |

TABLE 3

|  | Comparative Example 1 | Comparative Example 2 | Comparative Example 3 | Comparative Example 4 |
|---|---|---|---|---|
| Polycarbonate diol composition, etc. | B-1 | B-2 | B-3 | B-4 |
| Ether diol (I-1) | E-4 | — | E-2 | E-5 |
| Polycarbonate diol (II-1) | P-2 | P-2 | — | P-7 |
| Average number of repeats (n11) | 3.5 | — | 27.7 | 11.8 |

TABLE 3-continued

| | Comparative Example 1 | Comparative Example 2 | Comparative Example 3 | Comparative Example 4 |
|---|---|---|---|---|
| in structure (I) | | | | |
| Average number of repeats (n21) | 15.3 | 15.3 | — | 13.1 |
| in polycarbonate structure (II) | | | | |
| Amount of (I-1) added [g] | 198 | — | 300 | 329 |
| Amount of (II-1) added [g] | 53 | 300 | — | 470 |
| (I-1)/(II-1) mass ratio | 32/68 | 0/100 | 100/0 | 41/59 |
| State at 23° C. | Transparent liquid | Transparent liquid | White solid | Waxy |
| Melt viscosity at 50° C. [mPa · s] | 890 | 13000 | 835 | 1200 |
| Glass transition temperature [° C.] | −61.9 | −53.3 | −80.9 | −65.5 |
| GPC area ratio (Mn of 1000 or lower) [%] | 7.8 | 5 | 4.9 | 5.5 |
| Hydroxy value [mgKOH/g] | 134 | 55.8 | 58 | 86.7 |

[Application Example 1-1] Synthesis of Polyurethane Film PA-1

In a 500 ml separable flask in which a thermocouple and a condenser were installed, 38 g of the polycarbonate diol composition A-1, 224 g of dimethylformamide (hereinafter, also abbreviated to DMF), and 0.26 g of a 1% solution of dibutyltin dilaurate in toluene (50 ppm based on the total mass of MDI and the polycarbonate diol composition) were placed, and warmed in an oil bath of 40° C. While the solution in the flask was stirred at 100 rpm in a nitrogen atmosphere in the flask, 14.8 g of MDI (3.09 times [mol]) based on OH [mol] of the polycarbonate diol composition) was added dropwise thereto. The solution in the flask was further stirred for approximately 1.5 hours. The consumption of a theoretical amount was confirmed by the analysis of an isocyanate group concentration to obtain a prepolymer. Subsequently, a necessary amount (3.2 g) of 1,4-butanediol (1,4-BD) calculated from residual isocyanate was added in divided portions into the flask. The solution in the flask was stirred for approximately 1 hour. Then, approximately 1 g of ethanol was added thereto, and the solution in the flask was further stirred for 30 minutes to obtain a solution of polyurethane having a number-average molecular weight of 71600.

The obtained polyurethane was added dropwise to the upper part of a glass plate (JIS R3202, 2 mm×100 mm×150 mm), which was then coated using a 0.8 mm thick applicator such that a dry film thickness was 50 to 150 μm. The coating was dried for 2 hours on a hot plate having a surface temperature of 60° C. and subsequently for 12 hours in an oven of 80° C. The coating was further left standing under constant temperature and humidity conditions of 23° C. and 55% RH for 12 hours or longer to obtain polyurethane film PA-1. The obtained polyurethane film PA-1 was subjected to the evaluation of each physical property by the method described above. The evaluation results are shown in Table 4.

Application Examples 2-1 to 19-1

Polyurethane films PA-2 to PA-19 were obtained through reaction under the same conditions as in Application Example 1-1 except that in the production of the polyurethane film of Application Example 1-1, the polycarbonate diol composition used was changed to the polycarbonate diol compositions A-2 to A-19 produced in Examples 2 to 19. The obtained polyurethane films PA-2 to PA-19 were subjected to the evaluation of each physical property by the method described above. The evaluation results are shown in Tables 4 and 5.

Application Comparative Examples 1-1 to 4-1

Polyurethane films PB-1 to PB-4 were obtained through reaction under the same conditions as in Application Example 1-1 except that in the production of the polyurethane film of Application Example 1-1, the polycarbonate diol composition, etc. used was changed to the polycarbonate diol compositions, etc. B-1 to B-4 produced in Comparative Examples 1 to 4. The obtained polyurethane films PB-1 to PB-3 were subjected to the evaluation of each physical property by the method described above. The evaluation results are shown in Table 6.

TABLE 4

| | Application Example 1-1 | Application Example 2-1 | Application Example 3-1 | Application Example 4-1 | Application Example 5-1 | Application Example 6-1 | Application Example 7-1 | Application Example 8-1 |
|---|---|---|---|---|---|---|---|---|
| Polyurethane film | PA-1 | PA-2 | PA-3 | PA-4 | PA-5 | PA-6 | PA-7 | PA-8 |
| Polycarbonate diol composition | A-1 | A-2 | A-3 | A-4 | A-5 | A-6 | A-7 | A-8 |
| Number-average molecular weight Mn | 71600 | 68000 | 79200 | 64600 | 68500 | 67200 | 70200 | 69900 |
| Mw/Mn | 4 | 3.6 | 3.8 | 4.5 | 4.1 | 3.3 | 3.4 | 4.2 |
| Glass transition temperature [° C.] | −12.1 | −14 | −15.9 | −11.5 | −13.8 | −15.7 | −16.1 | −10.1 |
| 100% modulus/23° C. [MPa] | 4 | 3.5 | 2.6 | 4.1 | 3.3 | 2.5 | 2.3 | 4.2 |
| 100% modulus/−20° C. [MPa] | 24.1 | 20.9 | 13.4 | 23.4 | 19.1 | 13.4 | 11.1 | 25.5 |
| Oleic acid resistance test - Rate of swelling [%] | 11 | 13.3 | 19.4 | 11.1 | 14.4 | 16.2 | 19.4 | 25.1 |
| Moist heat resistance test - Retention [%] | 77.2 | 66.4 | 55.3 | 78.1 | 68.6 | 60.5 | 55.2 | 78.5 |
| Heat resistance test - Retention [%] | 80.8 | 76.2 | 70.2 | 81.1 | 77.2 | 73.8 | 71.9 | 77.5 |

*Mw/Mn: Weight-average molecular weight/number-average molecular weight

TABLE 5

| | Application Example 9-1 | Application Example 10-1 | Application Example 11-1 | Application Example 12-1 | Application Example 13-1 | Application Example 14-1 |
|---|---|---|---|---|---|---|
| Polyurethane film | PA-9 | PA-10 | PA-11 | PA-12 | PA-13 | PA-14 |
| Polycarbonate diol composition | A-9 | A-10 | A-11 | A-12 | A-13 | A-14 |
| Number-average molecular weight Mn | 72400 | 69000 | 73500 | 69800 | 76100 | 79200 |
| Mw/Mn | 3.2 | 3.9 | 4.2 | 4.1 | 4.1 | 4.2 |
| Glass transition temperature [° C.] | −10.9 | −8.8 | −12.9 | −12.8 | −13.1 | −13.1 |
| 100% modulus/23° C. [MPa] | 3.6 | 4.1 | 3.6 | 3.6 | 3.5 | 3.2 |
| 100% modulus/−20° C. [MPa] | 15.4 | 25.1 | 24 | 24.3 | 21.3 | 20.6 |
| Oleic acid resistance test - Rate of swelling [%] | 28.5 | 20.5 | 14.2 | 14 | 20.2 | 25.4 |
| Moist heat resistance test - Retention [%] | 55.3 | 63.5 | 60.1 | 62.1 | 50.3 | 49.6 |
| Heat resistance test - Retention [%] | 61.8 | 72.8 | 73.2 | 72.8 | 69.8 | 68.6 |

| | Application Example 15-1 | Application Example 16-1 | Application Example 17-1 | Application Example 18-1 | Application Example 19-1 |
|---|---|---|---|---|---|
| Polyurethane film | PA-15 | PA-16 | PA-17 | PA-18 | PA-19 |
| Polycarbonate diol composition | A-15 | A-16 | A-17 | A-18 | A-19 |
| Number-average molecular weight Mn | 73200 | 71200 | 73000 | 77500 | 78000 |
| Mw/Mn | 3.6 | 4.2 | 4.2 | 3.8 | 3.6 |
| Glass transition temperature [° C.] | −17.5 | −10.5 | −13.6 | −12.2 | −13.5 |
| 100% modulus/23° C. [MPa] | 2.1 | 4.2 | 4.7 | 4.3 | 4.5 |
| 100% modulus/−20° C. [MPa] | 12.1 | 24.8 | 21.1 | 25.3 | 19.2 |
| Oleic acid resistance test - Rate of swelling [%] | 36.8 | 29.8 | 22.2 | 14.1 | 18.2 |
| Moist heat resistance test - Retention [%] | 41.1 | 55 | 56 | 68.1 | 59.8 |
| Heat resistance test - Retention [%] | 55 | 70.2 | 71.2 | 76.2 | 71.1 |

*Mw/Mn: Weight-average molecular weight/number-average molecular weight

TABLE 6

| | Application Comparative Example 1-1 | Application Comparative Example 2-1 | Application Comparative Example 3-1 | Application Comparative Example 4-1 |
|---|---|---|---|---|
| Polyurethane film | PB-1 | PB-2 | PB-3 | PB-4 |
| Polycarbonate diol composition, etc. | B-1 | B-2 | B-3 | B-4 |
| Number-average molecular weight Mn | 74600 | 86000 | 94000 | 75000 |
| Mw/Mn | 3.8 | 3.5 | 2.5 | 4.1 |
| Glass transition temperature [° C.] | −11.3 | −6.3 | −44.5 | −11.8 |
| 100% modulus/23° C. [MPa] | 4.9 | 5.8 | 4 | 5.2 |
| 100% modulus/−20° C. [MPa] | 26.5 | 28.1 | 4.2 | 26.4 |
| Oleic acid resistance test-Rate of swelling [%] | 35.8 | 5.1 | 119 | 33.6 |
| Moist heat resistance test-Retention [%] | 62.1 | 91.3 | 28.3 | 42.2 |
| Heat resistance test-Retention [%] | 58.2 | 88.5 | 31.1 | 56.2 |

*Mw/Mn: Weight-average molecular weight/number-average molecular weight

[Application Example 1-2] Production of Coating Material Composition 16.8 g of the polycarbonate diol composition A-1 obtained in Example 1, 3.2 g of polyisocyanate (manufactured by Asahi Kasei Corp., "TKA-100" (trade name), NCO content ratio: 21.7%) as a curing agent so as to attain an NCO/OH molar ratio of 1.0, and 8.6 g of butyl acetate as a solvent so as to attain a solid content of 70% were each weighed and mixed with each other to obtain a coating material composition. A coating film was prepared as to the obtained coating material composition by the method described above, and evaluated for film formability. The evaluation results are shown in Table 7.

Application Examples 2-2 to 19-2

Each coating material composition was obtained under the same conditions as in Application Example 1-2 except that in the production of the coating material composition of Application Example 1-2, the polycarbonate diol composition used was changed to the polycarbonate diol compositions A-2 to A-19 produced in Examples 2 to 19. A coating film was prepared as to each obtained coating material composition by the method described above, and evaluated for film formability. The evaluation results are shown in Tables 7 and 8.

Application Comparative Examples 1-2 to 4-2

Each coating material composition was obtained under the same conditions as in Application Example 1-2 except that in the production of the coating material composition of Application Example 1-2, the polycarbonate diol composition, etc. used was changed to the polycarbonate diol compositions, etc. B-1 to B-4 produced in Comparative Examples 1 to 4. A coating film was prepared as to each obtained coating material composition by the method described above, and evaluated for film formability. The evaluation results are shown in Table 9.

coating material or polyurethane production, be able to produce polyurethane excellent in low-temperature flexibility and also excellent in oleic acid resistance and moist heat resistance, and be able to produce a coating material composition excellent in film formability even if a solid content concentration is high.

$$-\!\!\left(R^{11}\!-\!O\right)_{\!\overline{n11}}\qquad\qquad (I)$$

wherein $R^{11}$ is a divalent linear, branched or cyclic aliphatic, or aromatic hydrocarbon group having 2 or more and 20 or less carbon atoms, and a plurality of $R^{11}$ moieties are the same as or different from each other; and n11 is an arbitrary integer,

TABLE 7

| | Application Example 1-2 | Application Example 2-2 | Application Example 3-2 | Application Example 4-2 | Application Example 5-2 | Application Example 6-2 | Application Example 7-2 | Application Example 8-2 |
|---|---|---|---|---|---|---|---|---|
| Polycarbonate diol composition | A-1 | A-2 | A-3 | A-4 | A-5 | A-6 | A-7 | A-8 |
| Film formability (solid content: 70%) | ○ | ○ | ○ | ○ | ○ | ○ | ○ | ○ |

TABLE 8

| | Application Example 9-2 | Application Example 10-2 | Application Example 11-2 | Application Example 12-2 | Application Example 13-2 | Application Example 14-2 |
|---|---|---|---|---|---|---|
| Polycarbonate diol composition | A-9 | A-10 | A-11 | A-12 | A-13 | A-14 |
| Film formability (solid content: 70%) | ○ | ○ | ○ | ○ | ○ | ○ |

| | Application Example 15-2 | Application Example 16-2 | Application Example 17-2 | Application Example 18-2 | Application Example 19-2 |
|---|---|---|---|---|---|
| Polycarbonate diol composition | A-15 | A-16 | A-17 | A-18 | A-19 |
| Film formability (solid content: 70%) | ○ | Δ | ○ | ○ | ○ |

TABLE 9

| | Application Comparative Example 1-2 | Application Comparative Example 2-2 | Application Comparative Example 3-2 | Application Comparative Example 4-2 |
|---|---|---|---|---|
| Polycarbonate diol composition, etc. | B-1 | B-2 | B-3 | B-4 |
| Film formability (solid content: 70%) | Δ | × | × | Δ |

From the results shown in Tables 1 to 9, the polycarbonate diol compositions of Examples 1 to 19 comprising polycarbonate diol having a structure represented by the following general formula (I) (structure (I)) and a polycarbonate structure represented by the following general formula (II) (polycarbonate structure (II)), wherein melt viscosity at 50° C. is 1000 to 10000 mPa·s, and an average value of the number of repeats represented by n11 in the following general formula (I) is 12 or larger were found to be capable of reducing the amount of a solvent used at the time of $$-\!\!\left(R^{21}\!-\!O\!-\!CO\!-\!O\right)_{\!\overline{n21}}\qquad\qquad (II)$$

wherein $R^{21}$ is a divalent linear, branched or cyclic aliphatic, or aromatic hydrocarbon group having 2 or more and 15 or less carbon atoms, and a plurality of $R^{21}$ moieties are the same as or different from each other; and n21 is an arbitrary integer.

It was found that, particularly, when $R^{11}$ in the general formula (I) is a divalent branched aliphatic hydrocarbon group (e.g., an isopropylene group), polyurethane much superior in low-temperature flexibility and also much superior in oleic acid resistance and moist heat resistance can be obtained, and a coating material composition much superior in film formability even if a solid content concentration is high can be obtained.

From the results shown in Tables 1 to 9, the polycarbonate diol compositions in which the average value of the number of repeats represented by n11 in the structure (I) is a number of 12 or larger and 70 or smaller, and the average value of the number of repeats represented by n21 in the polycarbonate structure (II) is a number of 1 or larger and 50 or smaller (Examples 1 to 19) had more favorable low-temperature flexibility in the form of polyurethane than that of the polycarbonate diol composition lacking the configuration described above (Comparative Example 2).

From the comparison among Examples 1 to 3 and the comparison among Examples 4 to 7, the polycarbonate diol compositions exhibited a tendency to reduce melt viscosity at 50° C. with elevation in the content of the structure (I) and to be suitable for high-solid coating materials or polyurethane.

From the comparison among Examples 1 to 3 and 15, the polycarbonate diol compositions exhibited a tendency to improve the flexibility and low-temperature characteristics of the resulting polyurethane with elevation in the content of the structure (I) in the polycarbonate diol compositions.

From the comparison among Examples 1 to 3 and 15, the polycarbonate diol compositions exhibited a tendency to improve the durability, such as oleic acid resistance and moist heat resistance, of polyurethane with decrease in the content of the structure (I) in the polycarbonate diol compositions.

From the results described above, the polycarbonate diol composition of the present embodiment was confirmed to have low viscosity and therefore produce polyurethane excellent in durability, i.e., oleic acid resistance and moist heat resistance.

The present application is based on Japanese Patent Application No. 2019-188929 filed on Oct. 15, 2019, the contents of which are incorporated herein by reference.

INDUSTRIAL APPLICABILITY

The polycarbonate diol composition of the present invention is capable of producing, for example, high-solid coating materials or polyurethane, and is useful as a raw material of coating materials or polycarbonate-based polyurethane. Polyurethane produced using the polycarbonate diol composition of the present invention has features excellent in low-temperature flexibility and durability and can be suitably used in a wide range of fields such as elastic fibers, synthetic or artificial leather, coating materials, and high-performance elastomers.

The invention claimed is:

1. A polycarbonate diol composition comprising a polycarbonate diol having:

a plurality of structures represented by the following general formula (I):

$$\overline{\phantom{-}}\!\!\!+\!\!R^{11}\!\!-\!\!O\!\!\overline{\phantom{)}}_{n11}\!\!\overline{\phantom{-}} \tag{I}$$

wherein in each structure of the plurality of structures represented by the general formula (I):

$R^{11}$ is a divalent linear, branched or cyclic aliphatic, or aromatic hydrocarbon group having 2 or more and 20 or less carbon atoms, and n11 is an arbitrary integer; and a polycarbonate structure represented by the following general formula (II):

$$\overline{\phantom{-}}\!\!\!+\!\!R^{21}\!\!-\!\!O\!\!-\!\!CO\!\!-\!\!O\!\!\overline{\phantom{)}}_{n21}\!\!\overline{\phantom{-}} \tag{II}$$

wherein $R^{21}$ is a divalent linear, branched or cyclic aliphatic, or aromatic hydrocarbon group having 2 or more and 15 or less carbon atoms, and a plurality of $R^{21}$ moieties are the same as or different from each other, and n21 is an arbitrary integer;

wherein a melt viscosity of the polycarbonate diol at 50° C. is 1000 to 10000 mPa·s, and the plurality of structures represented by the general formula (I) are configured such that an average value of the number of repeats represented by n11 in the plurality of structures represented by general formula (I) is 12 or larger with the proviso that a structure of the general formula (I) wherein R11 is a divalent linear and/or branched aliphatic hydrocarbon group having 3 carbon atoms constitutes 60% by mass or more and 95% by mass or less of a total mass of the plurality of structures represented by the general formula (I).

2. The polycarbonate diol composition according to claim 1, wherein the average value of the number of repeats represented by n11 in the general formula (I) is 15 or larger.

3. The polycarbonate diol composition according to claim 1, wherein at least a portion of the polycarbonate diol has a structure of the general formula (II) wherein $R^{21}$ is at least two or more selected from the group consisting of divalent linear and branched aliphatic hydrocarbon groups having 2 or more and 15 or less carbon atoms.

4. The polycarbonate diol composition according to claim 1, wherein based on a total mass of the plurality of structures represented by the general formula (I) and the polycarbonate structure represented by the general formula (II), a content of the plurality of structures represented by the general formula (I) is 5% by mass or more and 40% by mass or less, and a content of the polycarbonate structure represented by the general formula (II) is 60% by mass or more and 95% by mass or less.

5. The polycarbonate diol composition according to claim 1, wherein a glass transition temperature measured with a differential scanning calorimeter is −50° C. or lower.

6. The polycarbonate diol composition according to claim 1, wherein state at 23° C. is liquid and transparent.

7. The polycarbonate diol composition according to claim 1, wherein an area ratio (%) of a number-average molecular weight (Mn) of 1000 or lower in molecular weight calculation results of the polycarbonate diol composition obtained by calculation by gel permeation chromatography is 7% or less.

8. A polyurethane prepared using the polycarbonate diol composition according to claim 1.

9. A synthetic leather comprising a base fabric, an adhesive layer, an intermediate layer and a surface skin layer laminated in order, the synthetic leather comprising the polyurethane according to claim 8.

10. The polycarbonate diol composition according to claim 2, wherein at least a portion of the polycarbonate diol has a structure of the general formula (II) wherein $R^{21}$ is at least two or more selected from the group consisting of divalent linear and branched aliphatic hydrocarbon groups having 2 or more and 15 or less carbon atoms.

11. The polycarbonate diol composition according to claim 2, wherein based on a total mass of the plurality of structures represented by the general formula (I) and the polycarbonate structure represented by the general formula (II), a content of the plurality of structures represented by the general formula (I) is 5% by mass or more and 40% by mass or less, and a content of the polycarbonate structure represented by the general formula (II) is 60% by mass or more and 95% by mass or less.

12. The polycarbonate diol composition according to claim 3, wherein based on a total mass of the plurality of structures represented by the general formula (I) and the polycarbonate structure represented by the general formula (II), a content of the plurality of structures represented by the general formula (I) is 5% by mass or more and 40% by mass or less, and a content of the polycarbonate structure represented by the general formula (II) is 60% by mass or more and 95% by mass or less.

13. The polycarbonate diol composition according to claim 10, wherein based on a total mass of the plurality of structures represented by the general formula (I) and the polycarbonate structure represented by the general formula (II), a content of the plurality of structures represented by the general formula (I) is 5% by mass or more and 40% by mass or less, and a content of the polycarbonate structure represented by the general formula (II) is 60% by mass or more and 95% by mass or less.

* * * * *